United States Patent [19]

Clerc et al.

[11] Patent Number: 4,889,412

[45] Date of Patent: Dec. 26, 1989

[54] LIQUID CRYSTAL CELL USING THE ELECTRICALLY CONTROLLED BIREFRINGENCE EFFECT AND A UNIAXIAL MEDIUM OF NEGATIVE OPTICAL ANISOTROPY USABLE THEREIN

[75] Inventors: Jean-Frédéric Clerc, Saint-Egrève; Jean-Claude Deutsch, Grenoble; Pierre Vaudaine, Grenoble; Sylvie Vey, Grenoble, all of France

[73] Assignee: Commissariat A l'Energie Atomique, Paris, France

[21] Appl. No.: 15,746

[22] Filed: Feb. 17, 1987

[30] Foreign Application Priority Data

Feb. 28, 1986 [FR] France .................. 86 02855

[51] Int. Cl.$^4$ .............................................. G02F 1/13
[52] U.S. Cl. ........................... 350/347 E; 350/339 R; 350/347 R
[58] Field of Search ............. 350/337, 339 R, 347 E, 350/347 R

[56] References Cited

U.S. PATENT DOCUMENTS 3,694,053 9/1972 Kahn .............................. 350/347 E
4,701,028 10/1987 Clerc et al. ................. 350/347 E X

FOREIGN PATENT DOCUMENTS 0162775 11/1985 European Pat. Off. ............ 1/137
2065321A 6/1981 United Kingdom ................ 1/137
82-03467 10/1982 World Int. Prop. O. ............ 1/133

OTHER PUBLICATIONS

Shanks, I. A., "Electro-Optical Colour Effects by Twisted Nematic Liquid Crystal," *Electronics Lett.*, vol. 10, No. 7, (apr. 1974) pp. 90–91.
Clerc, F., "Electro-Optical Limits of the E.C.B. Effect in Nematic Liquid Crystals," *Displays*, (Oct. 1981), pp. 341–347.
Robert, J. "TV Image with Liquid-Crystal Display," *IEEE Transactions on Electron Devices*, vol. ED-26, No. 8, (Aug. 1979), pp. 1128–1133.

Primary Examiner—Stanley D. Miller
Assistant Examiner—Richard Gallivan
Attorney, Agent, or Firm—James E. Nilles; Donald C. McGaughey

[57] ABSTRACT

Liquid crystal cell using the electrically controlled birefringence effect and processes for the production of the cell and a uniaxial medium or material of negative optical anistropy usable therein.

The cell can comprise two crossed rectilinear polarizers, two glass plates provided with transparent electrodes and placed between said polarizers, a liquid crystal layer between the plates and, between a plate and a polarizer, a layer of a negative uniaxial thermoplastic polymer having its extraordinary axis perpendicular to the plates. This layer can be obtained by heating the polymer up to the isotropic state, under a uniform pressure on the polarizers, cooling and eliminating the pressure. Application to the production of data display devices.

14 Claims, 3 Drawing Sheets

LIQUID CRYSTAL CELL USING THE ELECTRICALLY CONTROLLED BIREFRINGENCE EFFECT AND A UNIAXIAL MEDIUM OF NEGATIVE OPTICAL ANISOTROPY USABLE THEREIN

BACKGROUND OF THE INVENTION

The present invention relates to a liquid crystal cell using the electricity controlled birefringence effect and to processes for producing the cell and a negative optical anisotropy uniaxial medium usable therein. It more particularly applies to the production of data display devices, such as matrix screens and in particular to the construction of complex screens for colour display purposes.

Liquid crystal cells using the electrically controlled birefringence effect are already known. This effect has already made it possible to produce liquid crystal matrix screens and has already been described in publications such as the article by J. Robert entitled "T.V. image with L.C.D.", published in *IEEE Transactions on Electron Devices*, vol. ED 26, No. 8, August 1979 and the article by J. F. Clerc entitled "Electrooptical limits of the E.C.B. effect in nematic liquid crystals", published in the journal *Displays*, October 1981.

A liquid crystal cell using the electrically controlled birefringence effect e.g. comprises, according to the prior art, a nematic liquid crystal layer between two glass plates provided with transparent electrodes. Two polarizing means, e.g. two crossed rectilinear polarizers are respectively arranged on either side of the thus obtained assembly. When no voltage is applied between the electrodes, the molecules of the liquid crystal layer are substantially parallel to a direction called the "homeotropy direction" and perpendicular to the glass plates and incident light cannot pass through the cell. When an appropriate voltage is applied between the electrodes, the molecules of the liquid crystal layer are oriented substantially in a direction forming with the homeotropy direction an angle which is a function of the applied voltage or exciting voltage. An incident light can then at least partly pass through the cell. It is therefore possible to electrically control the light intensity transmitted through said cell, said intensity being a function of said voltage.

Liquid crystal cells using the electrically controlled birefringence effect suffer from the disadvantage that when observed obliquely, the contrast of these cells deteriorates and this increases as the observation angle increases and for certain observation angles this contrast can even be reversed.

French patent application No. 8407767 of May 18, 1984 proposes a liquid crystal cell using the electrically controlled birefringence effect and aiming at obviating this disadvantage.

However, the cell proposed suffers from disadvantages. It requires a given thickness of the liquid crystal layer, only permits an effective compensation of the birefringence of said layer in two incidence planes of the light and in the vicinity thereof and suffers from chromaticity defects, the extinction being less satisfactory for certain light wavelengths than for others.

SUMMARY OF THE INVENTION

The present invention aims at obviating the aforementioned disadvantages.

The present invention therefore relates to a liquid crystal cell using the electrically controlled birefringence effect and comprising an assembly, whereof one of the sides is exposed to incident light and has a nematic liquid crystal layer of positive optical anisotropy and at least two electrodes on either side of the layer and whereof at least that located on said side is transparent and at least on said side a means for polarizing the incident light, the molecules of the liquid crystal layer being substantially oriented in a homeotropy direction, in the absence of a voltage between the electrodes, wherein the cell also comprises at least one layer of a birefringence compensating medium, having three principal optical indices, whereof one is smaller than that of the two others, the axis corresponding to said index being parallel to the homeotropy direction.

The use of this layer of a medium for compensating the birefringence (of the nematic liquid crystal layer in its homeotropic structure for an oblique observation of the cell) makes it possible to retain a high contrast during observations of the cell under large angles, which can reach 70°. Moreover, the cell according to the invention does not suffer from the aforementioned chromaticity defects, permits an effective compensation of the birefringence in any light incidence plane and can be produced in any liquid crystal thickness, including very large thicknesses required for the production of complex screens (the thickness of the compensating medium layer obviously being adjusted, for optimum compensation purposes, as a function of the thickness of the liquid crystal layer). Moreover, the cell according to the invention is advantageously compatible with any polarization means (rectilinear, circular or eliptical).

Thus, the present invention makes it possible to produce display devices having a considerably liquid crystal thickness and which can therefore have a high multiplexing level and which are also achromatic, thus retaining the purity of the displayed colours and the stability thereof when observed obliquely.

In a special embodiment of the cell according to the invention the two electrodes are transparent, the cell comprises two complimentary polarizing means located on either side of said assembly and each compensating medium layer is located between one of the polarizing means and said assembly.

The term "complimentary polarizing means" is understood to mean e.g. two crossed rectilinear polarizers, or two complimentary eliptical or circular polarizers which are complimentary of one another with respect to an incident planar lightwave propagating in the homeotropy direction or respectively to the left and right with respect to said wave.

In a special embodiment, the two polarizing means are crossed rectilinear polarizers and the compensating medium is a uniaxial medium of negative optical anistropy having an axis of symmetry parallel to the homeotropy direction and an extraordinary axis parallel to said axis of symmetry.

In another special embodiment, the two polarizing means are complimentary circular polarizers and the compensating medium is a uniaxial medium of negative optical anistropy having an axis of symmetry parallel to the homeotropy direction and an extraordinary axis parallel to said axis of symmetry.

In these two embodiments, the compensating medium can be produced from a polymer material. Preferably, said polymer is thermoplastic. As will be shown hereinafter, this polymer makes it possible to produce in a relatively simple manner a layer not only making it possible to compensate the birefringence, but also to bond to one another the two components of the cell between which it is located.

In the case where the cell according to the invention is to be used for colour display purposes and therefore has a substrate provided with at least one coloured filter, the substrate can be advantageously maintained in place by the layer of said thermoplastic polymer. According to another special embodiment, the two polarizing means are crossed rectilinear polarizers and the compensating medium a biaxial medium, whereof the smallest index axis is parallel to the homeotropy direction.

Preferably the product of the thickness of each layer of said medium by the absolute value of the difference between the two other principal indices of said medium is approximately 0.125 micrometer, so that in the visible range said layer can constitute a quasi quarter-wave delay plate.

In an embodiment of the invention corresponding to a cell whose electrodes are transparent, said cell also comprises an optically reflecting layer placed at one end of the cell opposite to that which is to be exposed to incident light.

The present invention also relates to a process for producing a layer of a uniaxial medium having negative optical anistropy having an axis of symmetry perpendicular to said layer and an extraordinary axis parallel to said axis of symmetry, wherein the process comprises the successive stages of subjecting each side of a layer (single or multiple) of a thermoplastic polymer material, which is kept planar, to a uniform pressure, heating the layer maintained in said pressure state until it passes from its vitreous phase into its isotropic phase, stopping heating and eliminating the pressure. This process makes it possible to obtain relatively simply the said layer of a negative optical anistropy uniaxial medium, which is usable in certain realizations of the cell according to the invention. This uniaxial medium layer can be kept planar by two rigid, transparent, planar substrates between which it is placed.

Finally, the invention also relates to a process for producing a liquid crystal cell using the electrically controlled birefringence effect and comprising two transparent, planar substrates having a gap between them, which are fixed to one another and provided with electrodes, at least one polarizing means, the two substrates being placed on one side thereof and optionally a substrate provided with at least one coloured filter, wherein at least one of the elements taken in the group including each polarizing means and the substrate provided with at least one coloured filter is maintained in place, by disposing between said element and an adjacent component of the cell at least one layer of a thermoplastic polymer material, then subjecting the two sides of the assembly of the cell components to a uniform pressure, followed by heating the assembly maintained in this pressure state until each layer of material passes from its vitreous phase into its isotropic phase, then stopping heating and eliminating the pressure, a nematic liquid crystal layer being subsequently introduced between the substrates provided with electrodes.

This process makes it possible to advantageously integrate the production of one or more layers of axial medium with a negative optical anistropy, which can be used in a cell according to the invention, with the actual production of said cell and more particularly the sealing stage thereof.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
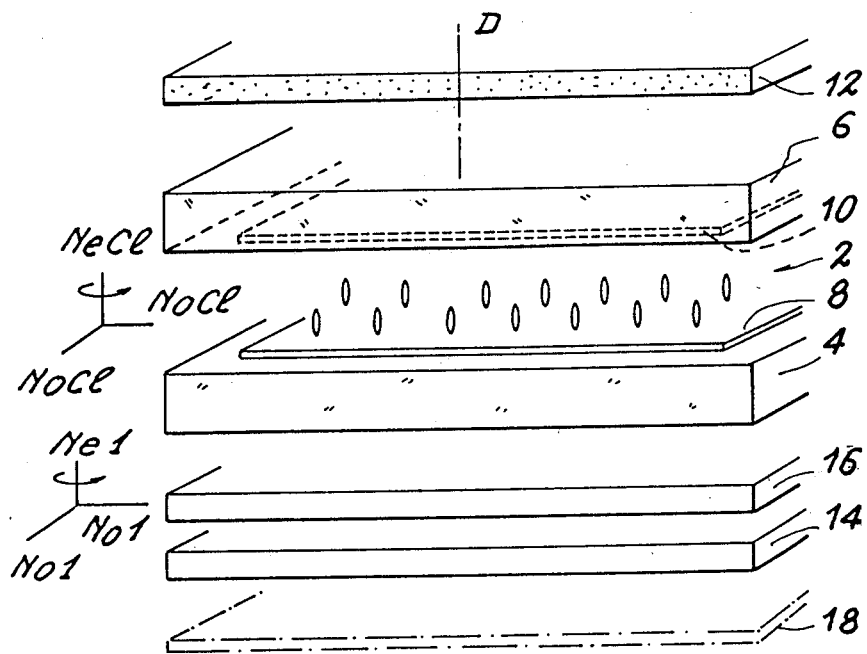
FIG. 1 A diagrammatic exploded view of a first embodiment of the cell according to the invention.

FIG. 1 is a diagrammatic exploded view of a liquid crystal cell corresponding to a first embodiment of the invention. This cell comprises a liquid crystal layer 2 between a lower plate 4 and an upper plate 6, which are parallel and transparent and are e.g. made from glass. Transparent electrodes 8 and 10 are respectively placed on the faces of plates 4 and 6, which directly face one another.

First and second crossed rectilinear polarizers 12, 14 surround the assembly constituted by layer 2 and by the two plates 4 and 6, the first polarizer 12 being on the side of plate 6 and the second polarizer 14 on the side of plate 4. The cell is intended to be illuminated by light which falls on the first polarizer 12 and observed through the second polarizer 14. These two polarizers are in the form of plates, which are parallel to plates 4 and 6.

The cell also comprises a plate or sheet 16 of a compensating medium located between the lower plate 4 and the second polarizer 14, parallel thereto and on which information will be given hereinafter.

The aforementioned cell operates in the transmissive mode. It could also operate in the reflective mode by adding thereto an optically reflecting layer 18 positioned opposite to plate 16 with respect to the second polarizer 14, parallel thereto and by then observing the cell through the first polarizer 12. The liquid crystal layer used is a nematic liquid crystal layer of negative dielectric anistropy, whereof the molecules are essentially oriented in a direction D perpendicular to plates 4 and 6 which is called the homeotropy direction in the absence of a voltage between the electrodes. This nematic liquid crystal layer is also a positive optical anistropy uniaxial medium, the extraordinary index NeCl of said medium exceeding its ordinary index NoCl. The ellipsoid of the indices of this medium has an axis of symmetry, which is the strong index axis (NeCl in the present case) and which is parallel to the major axes of the liquid crystal molecules, as well as to the homeotropy direction, in the absence of a voltage between the electrodes.

Compensating plate 16 is a negative optical anistropy uniaxial medium, the extraordinary index Nel of said medium being below its ordinary index Nol. The ellipsoid of the indices of this medium has an axis of symmetry, which is the weak index axis (Nel in the present case) and which is parallel to the homeotropy direction.

In a purely illustrative and non-limitative manner, the liquid crystal layer 2 is produced from the material marketed by MERCK under the reference ZLI 1936 (with NeCl−NoCl=0.19) and has a thickness of 5 micrometers, whilst plate 16 is a stack of 15 sheets each with a thickness of 50 micrometer made of a thermoplastic polymer marketed by Dupont de Nemours under the trade mark SURLYN.

In fact, the optiumum thickness of plate 16 is dependent on the thickness of the liquid crystal layer (linear law) and the thickness of plate 16 can be experimentally determined by fixing the thickness of the liquid crystal layer and by seeking the thickness of plate 16 leading to an optimum contrast under a given observation angle. Moreover, plate 16 could be positioned between plate 6 and polarizer 12, instead of between plate 4 and polarizer 14.

More generally, it is possible to replace plate 16 by a plurality of layers, some of which are located between plate 6 and polarizer 12 and others are located between plate 4 and polarizer 14, the total thickness of said layers being equal to the given thickness for plate 16.

Figure 2:
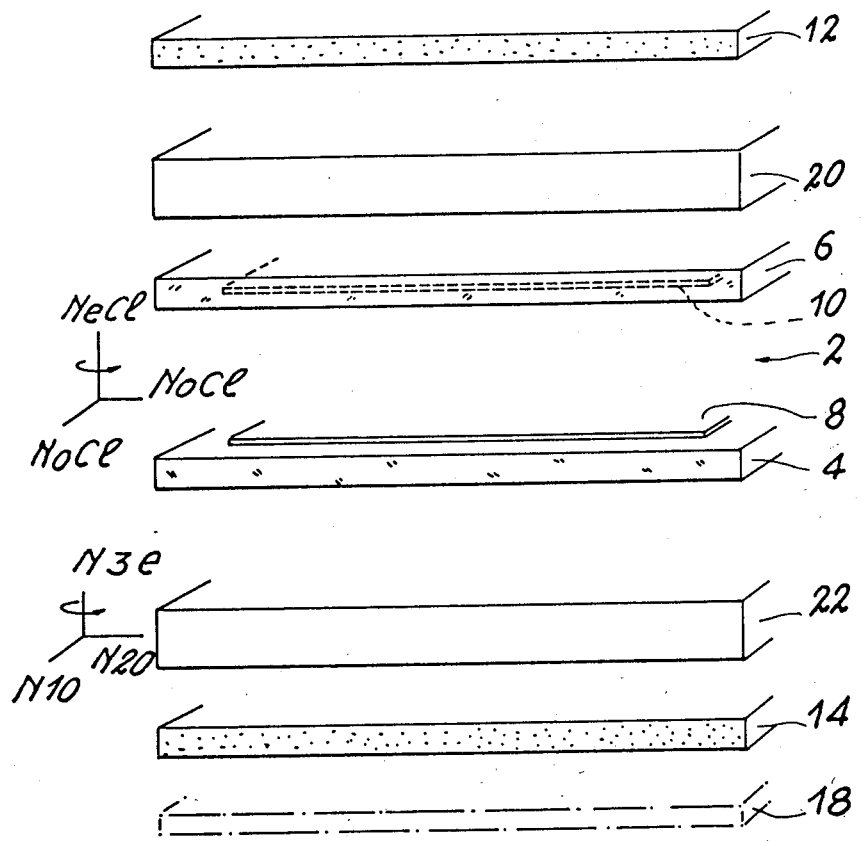
FIG. 2 An exploded diagrammatic view of a second embodiment of this cell.

FIG. 2 is an exploded diagrammatic view of a second embodiment of the cell according to the invention. This cell has a liquid crystal layer 2 between two glass plates 4, 6, provided with transparent electrodes 8, 10, as well as two crossed rectilinear polarizers 12, 14 and optionally an optically reflecting layer 18 (for operation in the reflective mode, thecell then being illuminated by light falling onto polarizer 12 and is also observed through the latter), whose relative disposition has been indicated in the description of FIG. 1.

The cell shown in FIG. 2 also has a plate 20 located between plate 6 and polarizer 12 and a plate 22 located between plate 4 and polarizer 14, said plates 20 and 22 being parallel to plates 4 and 6. The optical characteristics of the nematic liquid crystal layer 2 have been given in connection with FIG. 1.

Each plate 20 or 22 is a biaxial medium having two principal indices N1o and N2o with values close to one another and a third index N3e below N1o and N2o, the weak index axis N3e being parallel to the homeotropic direction.

Preferably, the thicknesses of plates 20 and 22 are substantially equal and the product of the absolute value of (N1o−N2o) by one or other of these thicknesses is chosen so as to be very close to 0.125 micrometer (condition 1) for each of the plates 20 and 22 which then, in the visible range, constitutes a quasi-quarter wave delay plate. This value of 0.125 micrometer corresponds to the brightness maximum of the cell shown in FIG. 2 in the "white" state corresponding to the cell under an exciting voltage.

The optimum thickness of each plate 20 or 22 (leading to an optimum contrast for a given observation angle and a given liquid crystal cell) can be experimentally determined as a function of the thickness chosen for the liquid crystal layer. It would also be possible to only use a compensating plate positioned either between plate 6 and polarizer 12, or between plate 4 and polarizer 14, said single plate then having a thickness equal to the sum of the thicknesses of plates 20 and 22, determined as a function of the thickness of the liquid crystal layer.

However, in the preferred embodiment referred to hereinbefore, as the thickness of plates 20 and 22 has already been fixed by condition 1, the optimum compensation of the birefringence of the liquid crystal layer is determined by choosing a constituent material of plates 20 and 22 having an optimum extraordinary index N3e for said compensation.

In a purely illustrative and in no way limitative manner, the liquid crystal layer is produced from the material marketed by MERCK under reference ZLI 1936, with NeCl−NoCl=0.19 and has a thickness between 4 and 6 micrometers, whilst each of the plates 20 and 22 is produced from a cellophane sheet marketed by Rhône Poulenc and has a thickness of approximately 3.5 to 4 micrometers, index N1o being equal to 1.660, index N2o equal to 1.6425 and index N3e equal to 1.5000.

Figure 3:
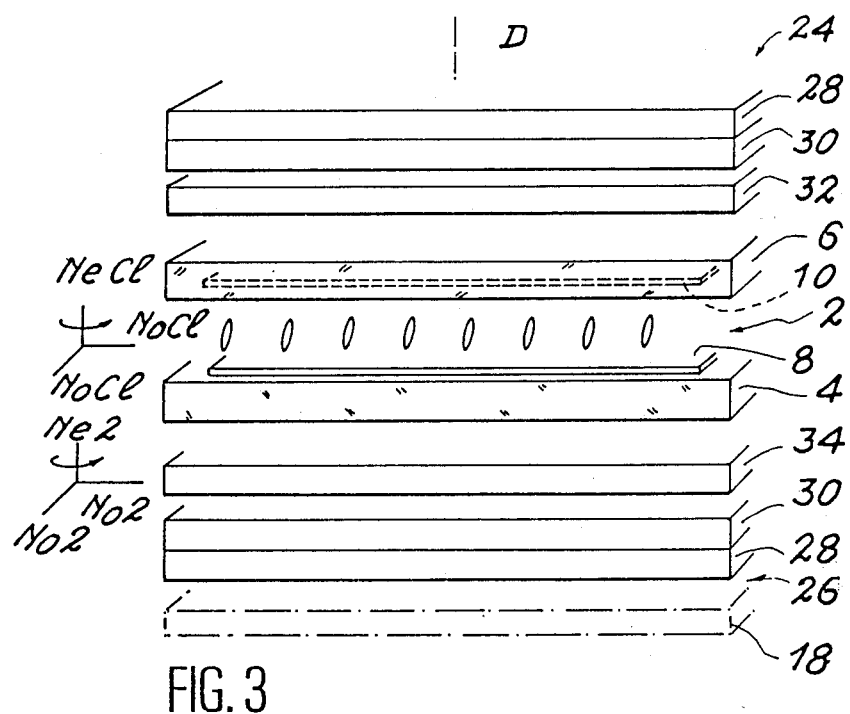
FIG. 3 An exploded diagrammatic view of a third embodiment of the cell.

FIG. 3 shows a third embodiment of the cell according to the invention, which comprises a liquid crystal layer 2 between two glass plates 4, 6, respectively provided with transparent electrodes 8 and 10. The arrangement of these elements has already been explained relative to FIG. 1. The optical characteristics of the liquid crystal layer 2 have also been given in connection with FIG. 1.

The cell shown in FIG. 3 also comprises a first circular polarizer 24 and a second circular polarizer 26 surrounding the assembly constituted by plates 4 and 6 and layer 2, the first polarizer 25 being on the side of plate 6, so that said polarizer receives the incident light, whilst the second polarizer 26 is on the side of plate 4, said polarizers 24 and 26 being parallel to plates 4 and 6 and the cell is observed through polarizer 26. Polarizers 24 and 26 are also complimentary to one another, i.e. for the incident light, one of the polarizers is to the left and the other to the right.

As hereinbefore, for reflective mode operation, an optically reflecting layer 18 can be provided opposite to plate 4 with respect to polarizer 26, the cell then being observed through polarizer 24.

Polarizer 24 is constituted by a rectilinear polarizer 28 associated with a quarter-wave plate 30, which is produced in a positive optical anistropy uniaxial medium, the major axis of said medium being in the plane of polarizer 28 (i.e. perpendicular to the homeotropy direction) and forms with the polarization direction of said polarizer 28 and angle of 45°. In the same way, the second circular polarizer 26 is identical to the first polarizer 24, the quarter-wave plates 30 of polarizers 24 and 26 respectively facing plates 6 and 4.

The cell shown in FIG. 3 also comprises at least one plate of a uniaxial material having negative optical anistropy, whose optical characteristics are those of plate 16 described relative to FIG. 1 and which is positioned parallel to plates 4 and 6, between one of said plates and one of the circular polarizers.

In the case of FIG. 3, the cell has two such plates 32, 34, plate 32 being located between plate 6 and polarizer 24 and plate 34 between plate 4 and polarizer 26.

The optimum thickness (optimum contrast under a given observation angle) of the single plate 32 or 34 (or the total optimum thickness of plates 32 and 34) is determined as a function of the thickness of liquid crystal layer 2. The use of one or more negative optical anistropy uniaxial material plates in the cell of FIG. 3 makes it possible to separately control the almost circular ellipticity throughout the visible range of the wave traversing the liquid crystal layer (which leads to a better luminous efficiency in the white state of the cell) and the compensating behaviour of the system comprising said negative optical anistropy uniaxial material plate and the two circular polarizers, the compensation depending on the preparation of said plate.

Each compensating plate used in the cell of FIG. 3 is produced in the same way as that used in the cell of FIG. 1 and its production (like that of each plate of the cell of FIG. 1) can be integrated into the stage of sealing the cell using the same and as will be shown hereinafter.

For the same liquid crystal thickness, the thickness of the negative optical anistropy uniaxial material, which is necessary for producing the cell of FIG. 3, is less than the thickness of the material necessary for producing the cell shown in FIG. 1, in view of the use of quarter-wave delay plates in the cell of FIG. 3.

In a purely indicative and in no way limitative manner, the cell shown in FIG. 3 has a liquid crystal layer with a thickness of 5 micrometers, produced from material marketed by MERCK under reference ZLI 1936, with NeCl−NoCl=0.19, each circular polarizer being of the type marketed by POLAROID under reference HCP 37 and each of the plates 32 and 34 is constituted by a stack of five sheets of the material marketed by Dupont de Nemours under the reference SURLYN, each sheet or film having a thickness of 80 micrometers.

Figure 4:
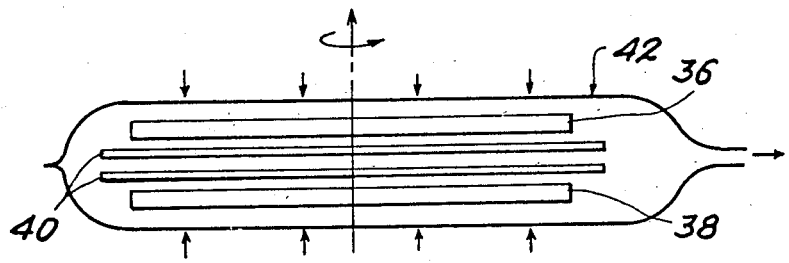
FIG. 4 Diagrammatically a special embodiment of the process according to the invention permitting the production of a layer of a uniaxial medium with negative optical anistropy usable in the present invention.

FIG. 4 diagrammatically illustrates a process for producing a layer of a uniaxial material of negative optical anistropy having an axis of symmetry perpendicular to said layer, the weak index axis of said layer being parallel to said axis of symmetry. Such a layer is usable in the production of the cell shown in FIGS. 1 and 3.

According to the process, between two rigid, planar, transparent substrates 36 and 38 is placed one or more sheets 40 of a thermoplastic material, e.g. of the type marketed by Dupont de Nemours under the trade mark SURLYN. At ambient temperature, such a material is in the vitreous state, but has a birefringence which is dependent on its past history. By heating to an appropriate temperature, the material passes from the vitreous state into the isotropic state, in which it no longer has birefringence.

Substrates 36 and 38 are e.g. two glass plates like plates 4 and 6 used in the cell described relative to FIG. 1.

With the sheet or sheets located between the substrates, a uniform pressure is applied to each of said substrates (normally thereto). For this purpose, the assembly constituted by the sheet or sheets and the substrates is introduced into a plastic bag 42, which can also be introduced into an oven for the reason indicated hereinafter, in order to produce a vacuum in said bag and thermally seal the same. A uniform pressure equal to atmospheric pressure is then applied to each substrate.

This is followed by the heating of the bag containing the assembly in question, e.g. in an oven, until the thermoplastic material reaches its temperature for the transition between the vitreous state and the isotropic state, after which the bag is removed from the oven and opened.

The material then cools and retracts. This retraction can only take place in a single direction perpendicular to the two substrates. Thus, an axis of symmetry S appears, which is perpendicular to said direction in said material which, on reassuming its vitreous state, returns to the birefringence state. Thus, a layer of a uniaxial material of negative optical anistropy is obtained having an axis of symmetry perpendicular to said layer and carries the extraordinary axis of the medium.

The process described hereinbefore with reference to FIG. 4 can be directly integrated in advantageous manner with a process for producing a liquid crystal cell according to the invention and more specifically with the stage of sealing said cell. The sealing is carried out hot and under pressure (prior to the introduction of the liquid crystal into said cell).

Figure 5:
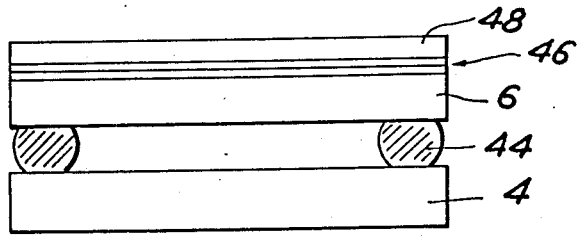
FIG. 5 Diagrammatically the integration of this process in the stage of sealing a cell produced according to the invention.

FIG. 5 illustrates this integration. Taking account of the two glass plates 4, 6, provided with not shown transparent electrodes and sealing means 44 and between which has to be subsequently introduced a liquid crystal layer, it is possible to place one or more thermoplastic polymer sheets 46 between one of the plates 4 and 6 and a transparent substrate 48, which can be one of the polarizers of the cell or a glass plate carrying coloured filters, when the cell is intended for colour display purposes. Glass plate 6 and substrate 48 then function in the same way as substrates 36 and 38 referred to in the description of FIG. 4.

More specifically, the assembly constituted by substrates 4, 6 and 48 and layer or layers 46 is introduced into a plastic bag which can be placed in an oven, the vacuum is formed in said bag and it is introduced into an oven. After the thermoplastic material has reached its transition temperature (which is known for a given material), the bag is removed from the oven and opened. As hereinbefore, during the subsequent cooling, the sheet or group of sheets stuck to one another by the oven treatment, becomes a layer of a uniaxial material with a negative optical anistropy with an axis of symmetry perpendicular to said layer and carrying the extraordinary axis of the medium or material. Moreover, due to the heating and the pressure, the thus obtained layer makes it possible to bond plate 6 and substrate 48 to one another.

For information purposes and in a non-limitative manner, in the case of a SURLYN-type material, the uniform pressure applied is approximately $10^5$Pa to $2.10^5$Pa and heating takes place at a temperature at least equal to 100° C., the transistion temperature of said material being approximately 90° C.

Thus, it is clearly possible to integrate the formation of one or more layers of negative optical anistropy uniaxial material layers into the production of a cell according to the invention using said layer or layers.

Figure 6:
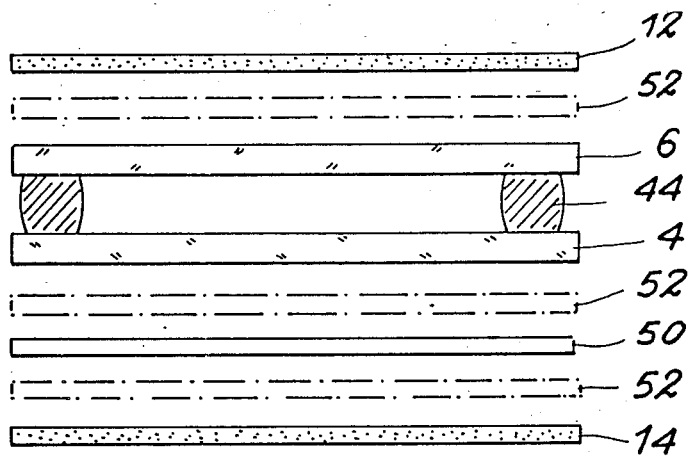
FIG. 6 A diagrammatic exploded view of a cell according to the invention also illustrating the integration of the production of several layers of the negative optical anistropy uniaxial medium used in said cell with the sealing stage thereof.

FIG. 6 also illustrates this integration possibility. For example, consideration is given to producing a cell according to the invention for use in colour display purposes. For this purpose it is possible to produce a cell of the type shown in FIG. 1, which is also equipped with a trichrome filter 50, e.g. placed between lower plate 4 and polarizer 14, parallel thereto, the number and configuration of the electrodes on either side of the liquid crystal layer obviously being adapted to the filter.

The thermoplastic polymer plate 16 shown in FIG. 1 and whose optimum thickness has been determined is replaced in the case of the cell shown in FIG. 3 by three layers 52 of the same nature as plate 16, but whereof the sum of the thicknesses is equal to that of plate 16.

By a process identical to that described relative to FIG. 5 (application of a uniform pressure to polarizers 12 and 14, heating in said pressure state up to the transition temperature of the thermoplastic polymer, elimination of the heating and then the pressure), it is possible to obtain an assembled cell in which the liquid crystal layer is introduced between plates 4 and 6.

Other embodiments of the cell according to the invention are possible and in particular an embodiment in which said cell successively is provided from the side which is to be exposed to the incident light with a circular polarizer, a negative optical anistropy uniaxial material plate, a first glass plate, a nematic liquid crystal layer and a second glass plate, the first plate being provided with transparent electrodes facing the liquid crystal layer and the second plate is provided, facing said layer, with an optically reflecting layer.

What is claimed is:

1. A liquid crystal cell assembly using the electrically controlled birefringence effect and having spaced apart sides, one of which is exposed to an incident light, said assembly comprising:
    a nematic liquid crystal molecular layer of positive optical anisotropy;
    at least two electrodes, one on either side of said liquid crystal layer, with the electrode located on said one side exposed to incident light being transparent;
    the molecules of said liquid crystal layer being substantially oriented in a homeotropic direction in the absence of a voltage between said electrodes;
    at least one means for polarizing said incident light located on said one side exposed to said incident light; and
    at least one layer of medium for compensating the birefringence of said nematic liquid crystal layer in its homeotropic structure for improving oblique observation of said cell, said medium having three principal optical indices each corresponding to an axis, one of said indices being weaker than the other two indices, and that axis which corresponds to said weak index being parallel to said homeotropic direction.

2. A cell according to claim 1, wherein the said electrodes are transparent, wherein the cell comprises two complementary polarizing means located on either side of said electrodes and wherein said compensating medium layer is located between at least one of said polarizing means and said electrode adjacent thereto.

3. A cell according to claim 2, wherein the two polarizing means are crossed rectilinear polarizers and wherein the compensating medium is uniaxial medium of negative optical anistropy having an axis of symmetry parallel to the homeotropic direction and an extraordinary axis parallel to said axis of symmetry.

4. A cell according to claim 3, wherein the compensating medium layer is produced from a polymer material.

5. A cell according to claim 4, wherein the polymer is thermoplastic.

6. A cell according to claim 5, wherein said polymer also comprises a substrate provided with at least one coloured filter, which is held in place by the thermoplastic polymer layer.

7. A cell according to claim 2, wherein the two polarizing means are complimentary circular polarizers and wherein the compensating medium layer is a uniaxial medium of negative optical anistropy having an axis of symmetry parallel to the homeotropic direction and an extraordinary axis parallel to said axis of symmetry.

8. A cell according to claim 7, wherein the compensating medium layer is formed from a polymer material.

9. A cell according to claim 8, wherein said polymer is thermoplastic.

10. A cell according to claim 9, wherein said polymer also comprises a substrate provided with at least one coloured filter, which is held in place by the layer of said thermoplastic polymer.

11. A cell according to claim 1, wherein the product of the thickness of each layer of said medium by the absolute value of the difference between the two other principal indices of said medium is approximately 0.125 micrometer.

12. A cell according to claim 2, wherein the two polarizing means are crossed rectilinear polarizers, wherein the compensating medium layer is a biaxial medium, and wherein said weak index is parallel to the homeotropic direction.

13. A cell according to claim 1, wherein said compensating medium layer also includes an optically reflecting layer placed at the side of the cell that is opposite to that which is to be exposed to incident light.

14. A liquid crystal cell assembly using the electrically controlled birefringence effect and having spaced apart sides, one of which is exposed to an incident light, said assembly comprising:
    a nematic liquid crystal molecular layer of positive optical anistropy;
    at least two electrodes, one on either side of said liquid crystal layer, with the electrode located on said one side exposed to incident light being transparent;
    the molecules of said liquid crystal layer being substantially oriented in a homeotropic direction in the absence of a voltage between said electrode;
    two complementary circular polarizer means for polarizing said incident light located on either side of said electrodes; and
    at least one layer of medium for compensating the birefringence of said nematic liquid crystal layer in its homeotropic structure for improving oblique observation of said cell located between at least one of said polarizer means and said electrode adjacent thereto, said compensating layer being a uniaxial medium of negative optical anistropy having an axis of symmetry parallel to the homeotropic direction and an extraordinary axis parallel to said axis of symmetry, said medium having three principal optical indices each corresponding to an axis, one of said indices being weaker than the other two indices, and that axis which corresponds to said weak index being parallel to said homeotropic direction.

* * * * *